(12) United States Patent
Tadele et al.

(10) Patent No.: US 12,540,867 B2
(45) Date of Patent: Feb. 3, 2026

(54) TEMPERATURE SENSING USING OPTICAL SENSORS

(71) Applicant: Apple Inc., Cupertino, CA (US)

(72) Inventors: Wegene H. Tadele, San Francisco, CA (US); Tao Shui, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 379 days.

(21) Appl. No.: 18/191,824

(22) Filed: Mar. 28, 2023

(65) Prior Publication Data

US 2023/0332960 A1    Oct. 19, 2023

Related U.S. Application Data

(60) Provisional application No. 63/363,234, filed on Apr. 19, 2022.

(51) Int. Cl.
| | | |
|---|---|---|
| G01K 13/20 | (2021.01) | |
| G01K 1/02 | (2021.01) | |
| G01K 1/20 | (2006.01) | |

(52) U.S. Cl.
CPC ............ *G01K 13/20* (2021.01); *G01K 1/026* (2013.01); *G01K 1/20* (2013.01)

(58) Field of Classification Search
CPC .......... G01K 1/20; G01K 13/20; G01K 1/026; G01K 7/01

(Continued)

(56) References Cited

U.S. PATENT DOCUMENTS

| | | | | |
|---|---|---|---|---|
| 3,812,717 A | * | 5/1974 | Miller | .................. H10D 48/387 |
| | | | | 327/512 |
| 5,195,827 A | | 3/1993 | Audy et al. | |

(Continued)

FOREIGN PATENT DOCUMENTS

| | | |
|---|---|---|
| CN | 109855750 A | 6/2019 |
| CN | 209689771 U | 11/2019 |
| GB | 2369437 A | 5/2002 |

OTHER PUBLICATIONS

Search Report received for United Kingdom Patent Application No. 2305530.4, mailed on Oct. 2, 2023, 2 Pages.

*Primary Examiner* — Peter J Macchiarolo
*Assistant Examiner* — Mireille S Sadate-Moualeu
(74) *Attorney, Agent, or Firm* — Kubota & Basol LLP

(57) ABSTRACT

This relates to using light emitting diodes (LEDs) and/or photodiodes (PDs) on a device intended to come in contact with a user for temperature sensing. In some examples, the LEDs and PDs can be used for both biometric sensing and user temperature sensing. By biasing the LEDs and PDs with different bias currents and obtaining different diode base-emitter voltages ($V_{BE}$) having known negative temperature coefficients, changes in $V_{BE}$ ($\Delta V_{BE}$) can be computed and used to estimate a user temperature. In particular, a measurement circuit including a current source or sink, an amplifier, and an analog to digital converter (ADC) can be connected to each LED and PD. Different bias currents can be applied to the LEDs and/or PDs (the PDs being forward-biased instead of their normal reverse-biased mode for biometric sensing) to obtain different $V_{BE}$ measurements, and those differences can be used in equations to estimate the temperature of the user.

23 Claims, 6 Drawing Sheets

(58) Field of Classification Search
USPC .......................................................... 374/100
See application file for complete search history.

(56) References Cited

U.S. PATENT DOCUMENTS

| | | | |
|---|---|---|---|
| 6,149,299 | A | 11/2000 | Aslan et al. |
| 9,603,524 | B2 | 3/2017 | Park et al. |
| 10,368,793 | B2 | 8/2019 | Brown et al. |
| 2005/0230600 | A1* | 10/2005 | Olson .................... H05B 45/18 250/214.1 |
| 2006/0093016 | A1 | 5/2006 | Mcleod et al. |
| 2013/0187619 | A1 | 7/2013 | Dunipace |
| 2022/0085231 | A1 | 3/2022 | Liu et al. |
| 2022/0197318 | A1* | 6/2022 | Seo .................... G05D 23/1917 |

* cited by examiner

_US 12,540,867 B2_

TEMPERATURE SENSING USING OPTICAL SENSORS

CROSS-REFERENCE TO RELATED APPLICATIONS

This application claims the benefit of U.S. Provisional Application No. 63/363,234, filed Apr. 19, 2022, the content of which is incorporated herein by reference in its entirety for all purposes.

FIELD OF THE DISCLOSURE

This relates generally to user temperature sensing systems and methods, and more particularly, to user temperature sensing systems and methods using optical sensors.

BACKGROUND OF THE DISCLOSURE

Different types of sensing devices are presently used to detect temperature or heat conditions within a device, such as dedicated temperature sensors within an electronic device. These temperature sensors often measure absolute temperature at their location within a device, and provide signals corresponding to their temperature measurements to processors on the electronic device. When temperature sensors are located on a wearable electronic device, they can also be used to estimate the temperature of a user wearing the device. However, when a temperature sensor on the wearable electronic device relies upon contact with the user's skin, poor skin contact can result in errors in the estimated temperature of the user. In addition, when the temperature sensors are installed into the wearable electronic device, coupling forces (e.g., screw forces) can apply lateral strain or other types of strain to the temperature sensors and introduce further error.

SUMMARY OF THE DISCLOSURE

This relates to using light emitting diodes (LEDs) and/or photodiodes (PDs) on a device intended to come in contact with a user for temperature sensing. In some examples, the LEDs and PDs can be used for both biometric sensing and for user temperature sensing. By biasing the LEDs and PDs with different bias currents and obtaining different diode base-emitter voltages ($V_{BE}$) having known negative temperature coefficients, changes in $V_{BE}$ ($\Delta V_{BE}$) can be computed and used to estimate the temperature of the user. In particular, a measurement circuit including a current circuit capable of sourcing or sinking current, an amplifier, and an analog to digital converter (ADC) can be connected to each LED and PD. Different bias currents can be applied to the LEDs and/or PDs (the PDs being forward-biased instead of their normal reverse-biased mode of operation for biometric sensing) to obtain different $V_{BE}$ measurements, and those differences can be used in equations to estimate the temperature of the user. Temperature estimates from multiple LEDs an/or PDs can be averaged or otherwise post-processed to account for differences in the quality of skin contact and/or atmospheric conditions (e.g., wind, humidity), and also to calibrate out the effect of different coupling forces (e.g., screw forces or other mechanical strains) seen by one or more of the LEDs and/or PDs.

DETAILED DESCRIPTION

In the following description of examples, reference is made to the accompanying drawings which form a part hereof, and in which it is shown by way of illustration specific examples that are optionally practiced. It is to be understood that other examples are optionally used and structural changes are optionally made without departing from the scope of the disclosed examples.

This relates to using light emitting diodes (LEDs) and/or photodiodes (PDs) on a device intended to come in contact with a user for temperature sensing. In some examples, the LEDs and PDs can be used for both biometric sensing and for user temperature sensing. By biasing the LEDs and PDs with different bias currents and obtaining different diode base-emitter voltages ($V_{BE}$) having known negative temperature coefficients, changes in $V_{BE}$ ($\Delta V_{BE}$) can be computed and used to estimate the temperature of the user. In particular, a measurement circuit including a current circuit capable of sourcing or sinking current, an amplifier, and an analog to digital converter (ADC) can be connected to each LED and PD. Different bias currents can be applied to the LEDs and/or PDs (the PDs being forward-biased instead of their normal reverse-biased mode of operation for biometric sensing) to obtain different $V_{BE}$ measurements, and those differences can be used in equations to estimate the temperature of the user. Temperature estimates from multiple LEDs an/or PDs can be averaged or otherwise post-processed to account for differences in the quality of skin contact and/or atmospheric conditions (e.g., wind, humidity), and also to calibrate out the effect of different coupling forces (e.g., screw forces or other mechanical strains) seen by one or more of the LEDs and/or PDs.

Figure 1A:
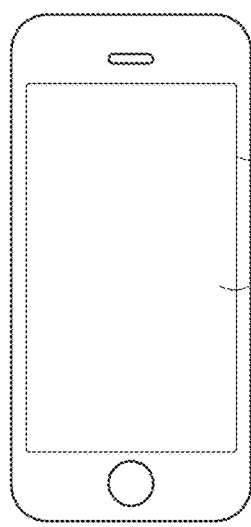
FIGS. 1A-1D illustrate exemplary systems with LEDs and/or PDs configurable for estimating the temperature of a user according to examples of the disclosure.
Figure 1B:
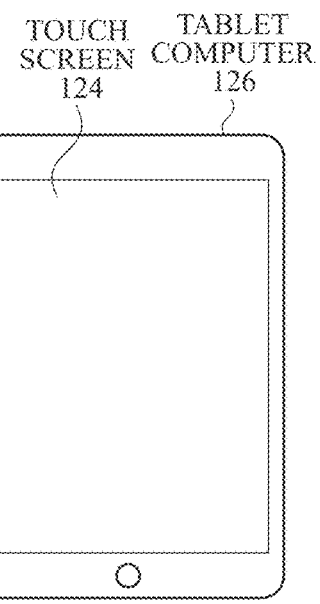
Figure 1C:
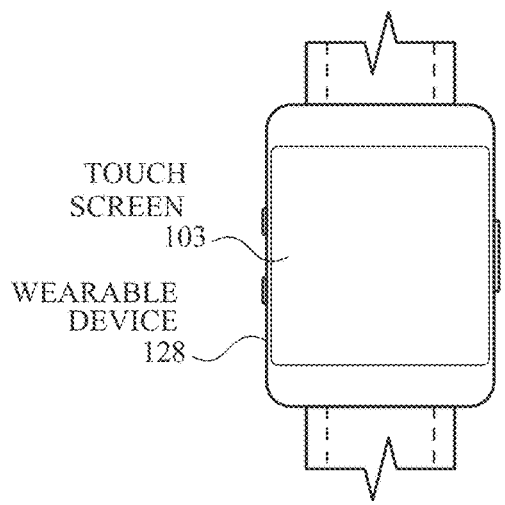
Figure 1D:
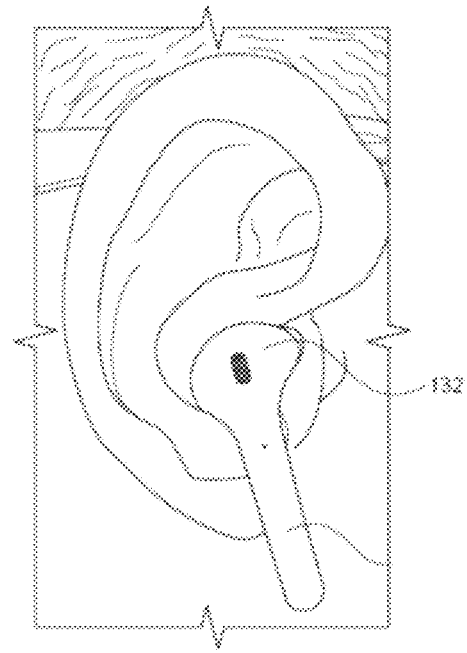

FIGS. 1A-1D illustrate exemplary systems with LEDs and/or PDs configurable for estimating the temperature of a user according to examples of the disclosure. FIG. 1A illustrates an exemplary mobile telephone 122 that includes a touch screen 124 and can include LEDs and/or PDs configurable for estimating the temperature of a user according to examples of the disclosure. FIG. 1B illustrates an example tablet computing device 126 that includes a touch screen 124 and can include LEDs and/or PDs configurable for estimating the temperature of a user according to examples of the disclosure. FIG. 1C illustrates an example watch 128 that includes a touch screen 103 and can include LEDs and/or PDs configurable for estimating the temperature of a user according to examples of the disclosure. FIG. 1D illustrates an example in-ear headphone 132 that can include LEDs and/or PDs configurable for estimating the temperature of a user according to examples of the disclosure.

It should be understood that the example devices illustrated in FIGS. 1A-1D are provided by way of example, and other types of devices intended to make contact with the skin of a user can also include LEDs and/or PDs configurable for estimating the temperature of a user according to examples of the disclosure. For example, the devices can include wearable devices worn on or placed into contact with the wrist, face, head, or the fingers of a user (or another location on a user's body). The devices can include over-ear headphones, fitness trackers, head-mounted devices, glasses, head bands, chest straps, wrist straps, rings, etc. For example, head-mounted devices or glasses worn on a user's face can include LEDs and/or PDs configurable for estimating the temperature at a user's temples, forehead or nose, among other possibilities. In a similar manner, a head band, chest strap or ring can include LEDs and/or PDs configurable for estimating the temperature of a user at a location of contact with the user's body.

Figure 2:
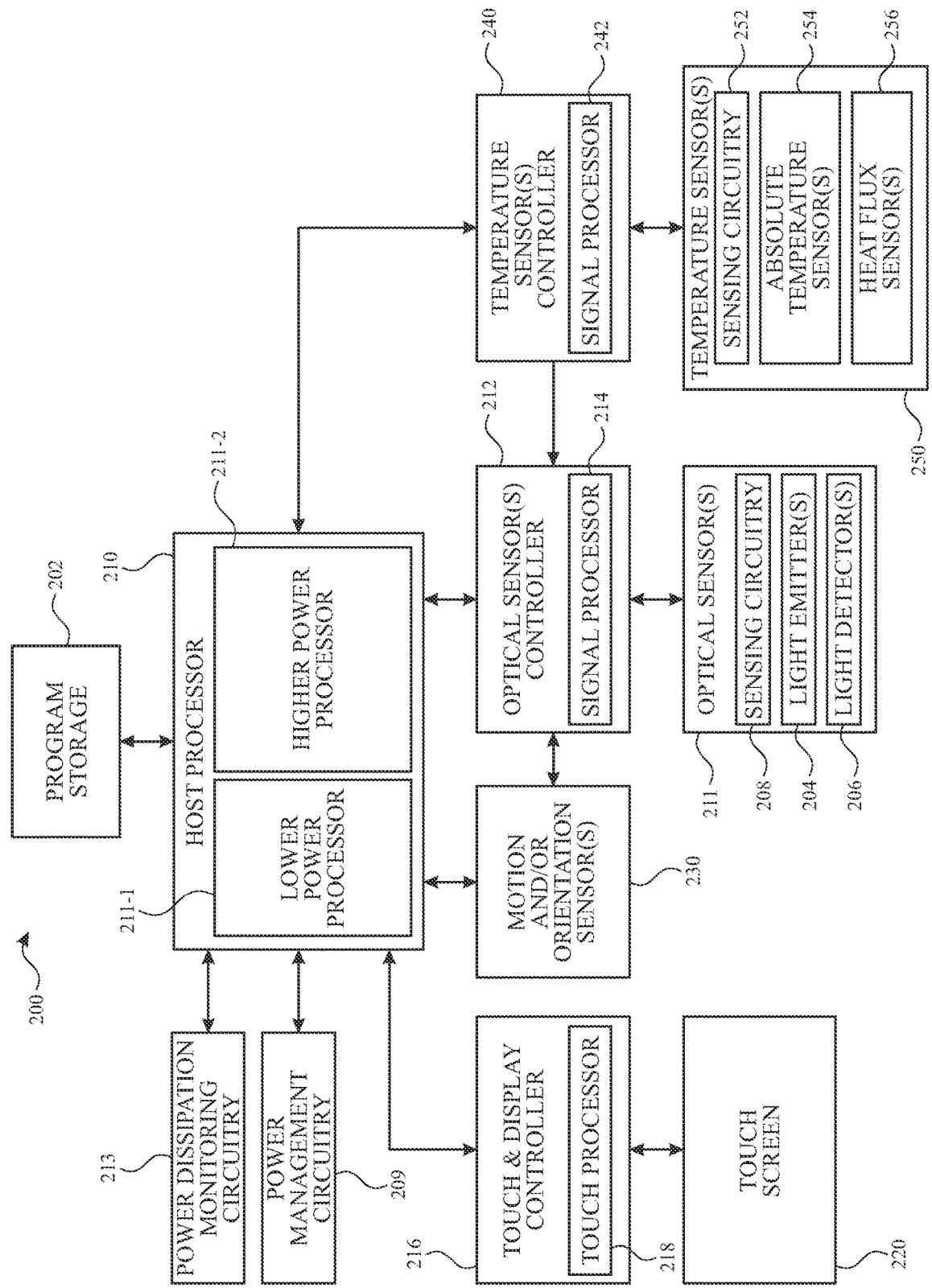
FIG. 2 illustrates a block diagram of a computing system of an exemplary electronic device that includes an LED and/or PD temperature sensing system according to examples of the disclosure.

FIG. 2 illustrates a block diagram of a computing system of an exemplary electronic device that includes an LED and/or PD temperature sensing system according to examples of the disclosure. Although primarily described herein as a wearable device, the computing system may alternatively be implemented partially in a wearable device, and partially in a non-wearable device. For example, the LEDs and/or PDs and/or processing described herein can be implemented partially or fully in a wearable device (e.g., a wristwatch), and the processing of the optical and/or temperature data can be performed in a non-wearable device (e.g., a mobile phone). In some examples, the temperature sensors, such as, can be implemented in a wearable device, and the processing of the data can be performed in a non-wearable device. Processing and/or storage of the optical and/or temperature data in a separate device can enable the device including the LEDs and/or PDs to be space and power efficient (which can be important features for portable/wearable devices).

Computing system 200 can correspond to devices 122, 126, 128 and 132 illustrated in FIGS. 1A-1D (or may be implemented in other wearable or non-wearable electronic devices). Computing system 200 can include a processor 210 (or more than one processor) programmed to (configured to) execute instructions and to carry out operations associated with computing system 200. For example, using instructions retrieved from program storage 202, processor 210 can control the reception and manipulation of input and output data between components of computing system 200. Processor 210 can be a single-chip processor (e.g., an application specific integrated circuit) or can be implemented with multiple components/circuits. For example, FIG. 2 illustrates that processor 210 can include a relatively lower power processor 211-1 and a relatively higher power processor 211-2, as described in more detail herein.

In some examples, processor 210 together with an operating system can operate to execute computer code, and produce and/or use data. The computer code and data can reside within a program storage 202 that can be operatively coupled to processor 210. Program storage 202 can generally provide a place to hold data used by computing system 200. Program storage block 202 can be any non-transitory computer-readable storage medium. By way of example, program storage 202 can include Read-Only Memory (ROM), Random-Access Memory (RAM), hard disk drive and/or the like. The computer code and data could also reside on a removable storage medium and loaded or installed onto computing system 200 when needed. Removable storage mediums include, for example, CD-ROM, DVD-ROM, Universal Serial Bus (USB), Secure Digital (SD), Compact Flash (CF), Memory Stick, Multi-Media Card (MMC) and/or a network component.

As described herein, in some examples processor 210 can represent multiple processors, such as lower power processor 211-1 and higher power processor 211-2. Lower power processor 211-1 and higher power processor 211-2 can represent separate processing chips, each with independent timing and power requirements. For example, lower power processor 211-1 can operate using a first clock signal and at a first power level that allows processor 211-1 to remain operational ("on") across most or all operating modes of system 200 (e.g., a sleep mode, awake mode, idle mode, etc.). By contrast, higher power processor 211-2 can operate using a second clock signal (e.g., a higher frequency clock), different from the first, and at a second power level, higher than the first. Because of the higher power requirements of higher power processor 211-2, host processor 210 (e.g., an operating system on processor 210) can selectively disable, or power down higher power processor 211-2 or otherwise throttle its power consumption during certain operating modes of system 200 (e.g., a power saving mode, sleep mode, etc.). In some examples, as described herein, the higher power processor 211-1 can be powered down or otherwise throttle its power consumption to enable temperature measurements without error introduced by the power dissipation by higher power processor 211-1.

Lower power processor 211-1 and/or higher power processor can interface with various sensors of system 200 including a touch sensor panel and/or a touch screen 220 (via touch and display controller 216), motion and/or orientation sensor(s) 230, optical sensor(s) 211 (via optical sensor controller 212), and temperature sensor(s) 250 (via temperature sensor controller 240). In some examples, lower power processor 211-1 can operate in a sleep mode or a power-saving mode, while higher power processor 211-2 is powered down. In some examples, lower power processor 211-1 can change an operating mode of system 200 or otherwise cause higher power processor 211-2 to be powered on (e.g., when wake up conditions are detected).

Computing system 200 can also include power management circuitry 209 and/or power dissipation monitoring circuitry 213. Host processor 210 (e.g., lower power processor 211-1 and/or higher power processor 211-2) can be coupled to power management circuitry 209 and/or power dissipation monitoring circuitry 213. Power management circuitry 209 can regulate power delivery from power supply circuitry (e.g., a battery, or other power source of system 200) to various components of system 200 (e.g., sensors, processors, antennas, displays, etc.). As an example, power management circuitry 209 can interrupt or throttle power delivery to components that generate heat within system 200 (e.g., thermal aggressors), especially during temperature measurements that may be sensitive to heat from such components. Power management circuitry 209 can monitor temperatures inside a housing of system 200 and/or temperatures outside the housing (e.g., environmental temperatures, user skin/core temperature). As an example, power management circuitry 209 can monitor these temperatures to detect unsafe operating conditions for system 200, and can selectively interrupt or throttle power delivery to certain heat-generating components to bring system 200 into a safe operating condition. In some examples, power management circuitry 209 provides control signals to inline switches coupled between the power supply circuitry of system and various components of system 200, where the control signals determine an amount of current or power that can be delivered to the respective components. As an example, power management circuitry 209 can provide a first control signal to a switch interposed between a battery power source of system 200 and touch screen 220, such that the first control signal limits the amount of power or current delivered to the touch screen by the battery power source. As another example, power management circuitry 209 can provide a second control signal to a switch interposed between a battery power source of system 200 and antenna circuitry (not shown) of the system, such that the second control signal interrupts power delivery or current flow between the battery power source and the antenna circuitry.

Power dissipation monitoring circuitry 213 can monitor power supply circuitry of system 200 (not shown), and can regulate power delivery from the power supply circuitry to various components of system 200 (e.g., by sending instructions to power management circuitry 209). In some examples, power dissipation monitoring circuitry 213 includes a sensor coupled to the power supply circuitry (e.g., battery) of system 200. The sensor can measure power drawn by components of system 200 from the power supply circuitry (e.g., battery of system 200). In some examples, the power drawing by components of the system can be estimated based on a current draw from the power supply circuitry. In some examples, the power drawn can be estimated on a device basis (e.g., estimated current draw from the battery). In some examples, the power drawn can be estimated on a per-component basis for some (e.g., known thermal aggressors) or all of the components. In some examples, the power dissipation monitoring circuitry 213 includes at least one resistor (e.g., with a resistance greater than 10 MOhm, 20 MOhm, etc.) coupled between with the power supply circuitry or battery of system 200 and components of system 200 that draw power. A current through the resistor can be measured by determining a voltage across the resistor (e.g., periodically or in response to a trigger) and converting the voltage to a resistance (e.g., using Ohms law).

In some examples, computing system 200 (e.g., processor 210, power management circuitry 209, and/or power dissipation monitoring circuitry 213) can include power dissipation models that relate current/power draw from the power supply or battery of system 200 and temperature or heat dissipation within the device. Additionally or alternatively, computing system 200 can include models for estimating the power consumption and/or resulted temperature changes by different components, in different operational modes of system 200 (e.g., power consumption by touch screen 220 in an idle mode, in a low-brightness mode, in a high-brightness mode, etc.). Impacts of the power consumption of certain components, or thermal aggressors of system 200, can be determined using lab characterizations of the components (e.g., a rise time, a fall time, and amplitude measured for each thermal aggressor at various respective power levels). Accordingly, computing system 200 can dynamically model temperatures within the system 200, based on power dissipation models, and one or more current/power draw measurement at the system's power supply circuitry or battery. In some examples, power management circuitry 209 can limit or interrupt the delivery of power to certain components, such as during a measurement interval associated with temperature sensors 250 (e.g., an interval where sensor data is collected from temperature sensors 250), based on information from power dissipation monitoring circuitry 213. As an example, when a power dissipation model indicated that an amount of power being drawn by components of system 200 corresponds to a temperature within the device outside of a range required for accurate and/or reliable operation of temperature sensors 250, power management circuitry 209 to limit or interrupt power to components of system 200 such that the total power drawn by the components can be reduced to a level corresponding to a temperature within the range required for accurate and/or reliable operation of temperature sensors 250. In some examples, power dissipation monitoring circuitry 213 and/or power management circuitry can cause host processor 210 to delay the performance of certain functions or operations to limit or interrupt power to components of system 200. As an example, host processor 210 can postpone operations (or modify operations for reduced power consumption) involving touch screen 220, GPS circuitry (not shown), wireless communication chips (not shown), antennas (not shown), or other components of system 200 that can be thermal aggressors, until after a measurement interval associated with temperature sensors 250 (e.g., an interval during which one or more of the components receives less power).

Additionally or alternatively, characterizations of the components (e.g., a rise time, a fall time, and amplitude measured for each thermal aggressor at various respective power levels) can be used for temperature compensation. For example, host processor 210 can use temperature compensation models to adjust sensor measurements or sensor data according to the temperature within the device or the temperature contribution of thermal aggressors (e.g., heat-generating components of system 200). As an example, the amount of power draw by components of system 200 can be measured by power dissipation monitoring circuitry 213. The measured power draw can be used to correct for heat from thermal aggressors within the device. In some examples, the compensation can be applied when the power draw corresponds to a temperature change outside of a range required for accurate and/or reliable operation of temperature sensors 250. Accordingly, a temperature compensation model (e.g., the temperature change corresponding to the amount of power drawn by the components) can be used (e.g., by temperature sensor controller 240) to adjust sensor data from temperature sensors 250 to account for the elevated temperature within the device caused by thermal aggressors.

Computing system 200 can also include one or more input/output (I/O) controllers that can be operatively coupled to processor 210. I/O controllers can be configured to control interactions with one or more I/O devices (e.g., touch sensor panels, display screens, touch screens, physical buttons, dials, slider switches, joysticks, or keyboards). I/O controllers can operate by exchanging data between processor 210 and the I/O devices that desire to communicate with processor 210. The I/O devices and I/O controller can communicate through a data link. The data link can be a unidirectional or bidirectional link. In some cases, I/O devices can be connected to I/O controllers through wireless connections. A data link can, for example, correspond any wired or wireless connection including, but not limited to, PS/2, Universal Serial Bus (USB), Firewire, Thunderbolt, Wireless Direct, IR, RF, Wi-Fi, Bluetooth or the like.

Computing system 200 can include a temperature sensor controller 240 operatively coupled to processor 210 and to one or more temperature sensors 250. As described herein, in some examples, the temperature sensor controller 240 can be coupled to optical sensor controller 212. The temperature sensors 250 can include one or more absolute temperature sensors 254, one or more heat flux sensors 256, and corresponding sensing circuitry 252 (e.g., analog and/or digital circuitry to measure signals at the sensors 254/256, provide processing (e.g., amplification, filtering, level-shifting), and convert analog signals to digital signals). As an example, the one or more absolute temperature sensors 254 and one or more heat flux sensors 256 can be configured to measure temperature at various locations within system 200, including at least one location or region inside the wearable device different than a location or region in which an absolute temperature sensor is disposed for system 200. These temperatures and/or heat flux measurements can be used to measure temperature characteristics of the device under various modes of operation (e.g., to estimate when temperatures within a device are approaching unsafe or unsustainable levels), to estimate ambient temperatures outside the device, or to estimate a physiological signal associated with a user (e.g., a body temperature of the user)). Measured raw data from the absolute temperature sensors 254, heat flux sensors 256, and sensing circuitry 252 can be transferred to processor 210 (via temperature sensor controller 240), and processor 210 can perform the signal processing described herein to estimate internal or external temperatures and/or to estimate physiological signals (e.g., body temperature associated with the user). Processor 210 and/or temperature sensor controller 240 can operate temperature sensors 250 to measure temperature values associated with system 200, and to estimate temperature values associated with the environment external to the system. In some examples, temperature sensor controller 240 can include signal processor 242 to sample, filter, and/or convert (from analog to digital) signals generated by various temperature sensors 250, which can be positioned at different locations within a housing for system 200. Signal processor 242 can be a digital signal processing circuit such as a digital signal processor (DSP). The analog data measured by the temperature sensors 250 can be converted into digital data by an analog to digital converter (ADC). In some examples, and the digital data from the temperature sensors can be stored for processing in a buffer (e.g., a FIFO) or other volatile or non-volatile memory (not shown) in temperature sensor controller 240. In some examples, data from the temperature sensors are used as inputs to a heat model for the device, and used to estimate temperatures external to the housing of system 200 (e.g., temperature of an object or user that contacts a portion of the device or an ambient temperature). In some examples, processor 210 and/or temperature sensor controller 240 can store the raw data and/or processed information in memory (e.g., ROM or RAM) for historical tracking or for future diagnostic purposes.

To accurately model the environment outside of system 200, in some examples, absolute temperature sensors 254 and heat flux sensors 256 can be used in conjunction. In certain examples, temperature sensor controller 240 can use measurements from multiple separate absolute temperature sensors 254, ideally located at well-characterized locations within the housing of system 200, to estimate heat flux through the device (e.g., without one or more dedicated heat flux sensors). In some examples, absolute temperature sensors can include a negative temperature coefficient (NTC) temperature sensor, a resistance temperature detector (RTD), or a diode based temperature sensor. A heat flux sensor 256, such as a thermopile temperature sensor, includes multiple thermocouples coupled in series. Each thermocouple can include two (or more) different conductive materials, characterized by or otherwise associated with different respective Seebeck coefficients. A first end of a heat flux sensor 256 can include a first set of junctions between the two different conductive materials, and a second end of the heat flux sensor 256 can include a second set of junctions between the two different conductive materials. When these two ends of a heat flux sensor 256 can be positioned at respective first and second locations within system 200, the heat flux sensor 256 can generate a voltage signal proportional to a temperature gradient or a temperature difference between the first and second locations within system 200. When one end of a heat flux sensor 256 is positioned close to, or mechanically coupled to a location or region within a housing for system 200, temperature sensor controller 240 can use the temperature gradient generated by the heat flux sensor to estimate the temperature of objects that contact an outer surface location of system 200 that can correspond to where one end of the heat flux sensor 256 can be positioned inside the device.

Computing system 200 can include an optical sensor controller 212 operatively coupled to processor 210 and to one or more optical sensors 211. The optical sensor(s) can include light emitter(s) 204 (e.g., LEDs), light detector(s) 206 (e.g., PDs) and corresponding sensing circuitry 208 (e.g., analog circuitry to drive emitters and measure signals at the detector, provide processing (e.g., amplification, filtering), and convert analog signals to digital signals). As an example, light emitters 204 and light detectors 206 can be configured to generate and emit light into a user's skin and detect returning light (e.g., reflected and/or scattered) to measure a physiological signal (e.g., a photoplethysmogram, or PPG signal). The absorption and/or return of light at different wavelengths can also be used to determine a characteristic of the user (e.g., oxygen saturation, heart rate) and/or about the contact condition between the light emitters 204/light detectors 206 and the user's skin. Measured raw data from the light emitters 204, light detectors 206 and sensing circuitry 208 can be transferred to processor 210, and processor 210 can perform the signal processing described herein to estimate a characteristic (e.g., oxygen saturation, heart rate, etc.) of the user from the physiological signals. Processor 210 and/or optical sensor controller 212 can operate light emitters 204, light detectors 206 and/or sensing circuitry 208 to measure data from the optical sensor. In some examples, optical sensor controller 212 can include timing generation for light emitters 204, light detectors 206 and/or signal processor 214 to sample, filter and/or convert (from analog to digital) signals measured from light at different wavelengths. Optical sensor controller 212 can process the data in signal processor 214 and report outputs (e.g., PPG signal, relative modulation ratio, perfusion index, heart rate, on-wrist/off-wrist state, etc.) to the processor 210. Signal processor 214 can be a digital signal processing circuit such as a digital signal processor (DSP). The analog data measured by the optical sensor(s) 211 can be converted into digital data by an analog to digital converter (ADC), and the digital data from the physiological signals can be stored for processing in a buffer (e.g., a FIFO) or other volatile or non-volatile memory (not shown) in optical sensor controller 212. In some examples, some light emitters and/or light detectors can be activated, while other light emitters and/or light detectors can be deactivated (by power management circuitry 209) to conserve power, for example, or for time-multiplexing (e.g., to avoid interference between channels). In some examples, processor 210 and/or optical sensor controller 212 can store the raw data and/or processed information in memory (e.g., ROM or RAM) for historical tracking or for future diagnostic purposes.

In some examples, some light emitters and/or light detectors have operational characteristics that vary based on the temperature of the light emitters and/or light detectors. As an example, some light emitters may output light at a wavelength that varies based on the temperature of the light emitter. In some examples, optical sensor controller 212 and/or processor 210 (higher power processor 211-2 and/or lower power processor 211-1) can receive temperature information associated with the light emitter (e.g., from temperature sensor controller 240), and adjust the wavelength of the optical sensor and/or processing of signals associated with the light emitter and/or a corresponding light detector based on the received temperature information. For example, an estimation of a physiological characteristic (e.g., oxygen saturation, heart rate) may be sensitive to wavelengths of light used to measure optical signals. In some examples, the optical sensor controller 212 and/or processor 210 can use the received temperature information to estimate a wavelength of light generated by the optical sensor and compensate the estimation of the physiological characteristic based on the estimated wavelength of light.

Computing system 200 can also include one or more motion and/or orientation sensors 230, such as an accelerometer, a gyroscope, an inertia-measurement unit (IMU), etc. In some examples, the motion and/or orientation sensors 230 can include a multi-channel accelerometer (e.g., a 3-axis accelerometer).

Computing system 200 can also include, in some examples, a touch and display controller 216 operatively coupled to processor 210 and to touch screen 220. Touch screen 220 can be configured to display visual output in a graphical user interface (GUI), for example. The visual output can include text, graphics, video, and any combination thereof. In some examples, the visual output can include a text or graphical representation of the physiological signal (e.g., a PPG waveform) or a characteristic of the physiological signal (e.g., oxygen saturation, heart rate, etc.) Touch screen can be any type of display including a liquid crystal display (LCD), a light emitting polymer display (LPD), an electroluminescent display (ELD), a field emission display (FED), a light emitting diode (LED) display, an organic light emitting diode (OLED) display, or the like. Processor 210 can send raw display data to touch and display controller 216, and touch and display controller 216 can send signals to touch screen 220. Data can include voltage levels for a plurality of display pixels in touch screen 220 to project an image. In some examples, processor 210 can be configured to process the raw data and send the signals to touch screen 220 directly. Touch and display controller 216 can also detect and track touches or near touches (and any movement or release of the touch) on touch screen 220. For example, touch processor 218 can process data representative of touch or near touches on touch screen 220 (e.g., location and magnitude) and identify touch or proximity gestures (e.g., tap, double tap, swipe, pinch, reverse-pinch, etc.). Processor 210 can convert the detected touch input/gestures into interaction with graphical objects, such as one or more user-interface objects, displayed on touch screen 220 or perform other functions (e.g., to initiate a wake of the device or power on one or more components).

In some examples, touch and display controller 216 can be configured to send raw touch data to processor 210, and processor 210 can process the raw touch data. In some examples, touch and display controller 216 can process raw touch data itself (e.g., in touch processor 218). The processed touch data (touch input) can be transferred from touch processor 218 to processor 210 to perform the function corresponding to the touch input. In some examples, a separate touch sensor panel and display screen can be used, rather than a touch screen, with corresponding touch controller and display controller.

In some examples, the touch sensing of touch screen 220 can be provided by capacitive touch sensing circuitry (e.g., based on mutual capacitance and/or self-capacitance). For example, touch screen 220 can include touch electrodes arranged as a matrix of small, individual plates of conductive material or as drive lines and sense lines, or in another pattern. The electrodes can be formed from a transparent conductive medium such as ITO or ATO, although other partially or fully transparent and non-transparent materials (e.g., copper) can also be used. In some examples, the electrodes can be formed from other materials including conductive polymers, metal mesh, graphene, nanowires (e.g., silver nanowires) or nanotubes (e.g., carbon nanotubes). The electrodes can be configurable for mutual capacitance or self-capacitance sensing or a combination of mutual and self-capacitance sensing. For example, in one mode of operation, electrodes can be configured to sense mutual capacitance between electrodes; in a different mode of operation, electrodes can be configured to sense self-capacitance of electrodes. During self-capacitance operation, a touch electrode can be stimulated with an AC waveform, and the self-capacitance to ground of the touch electrode can be measured. As an object approaches the touch electrode, the self-capacitance to ground of the touch electrode can change (e.g., increase). This change in the self-capacitance of the touch electrode can be detected and measured by the touch sensing system to determine the positions of one or more objects when they touch, or come in proximity to without touching, the touch screen. During mutual capacitance operation, a first touch electrode can be stimulated with an AC waveform, and the mutual capacitance between the first touch electrode and a second touch electrode can be measured. As an object approaches the overlapping or adjacent region of the first and second touch electrodes, the mutual capacitance therebetween can change (e.g., decrease). This change in the mutual capacitance can be detected and measured by the touch sensing system to determine the positions of one or more objects when they touch, or come in proximity to without touching, the touch screen. In some examples, some of the electrodes can be configured to sense mutual capacitance therebetween and some of the electrodes can be configured to sense self-capacitance thereof.

Note that one or more of the functions described herein, including estimating a temperature internal or external to an electronic device according to examples of the disclosure, can be performed by firmware stored in memory (or in program storage 202) and executed by temperature sensor controller 240, optical sensor controller 212, touch and display controller 216 or processor 210. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
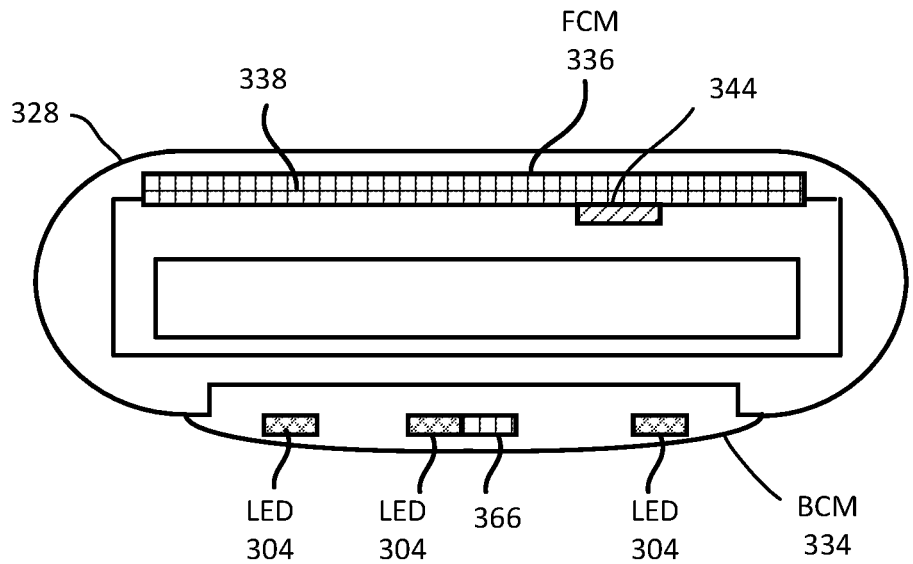
FIG. 3A illustrates a symbolic cross-sectional view of an example device (e.g., a watch) that is intended to come into contact with a user's skin according to examples of the disclosure.

FIG. 3A illustrates a symbolic cross-sectional view of an example device 328 (e.g., a watch) that is intended to come into contact with a user's skin according to examples of the disclosure. In some examples, device 328 can include front crystal module (FCM) 336 having touch screen 338 and an optional absolute temperature sensor 344. In some examples, device 328 can also include back crystal module (BCM) 334 having LEDs 304 and PDs (not shown in FIG. 3A) that are configurable for estimating the temperature of a user according to examples of the disclosure. LEDs 304 and PDs may collectively be referred herein to as optical diodes. LEDs 304 and the PDs can correspond to light emitters 204 and light detectors 206 shown in FIG. 2 and described above. Although not shown in FIG. 3A, in some examples each LED 304 can represent a cluster of multiple LEDs, and each cluster can include, but is not limited to, red, green and infrared (IR) LEDs. However, unless otherwise indicated, the term "LED" as utilized herein is a reference to one LED, even though LED 304 can contain a cluster of LEDs. Device 328 can also optionally include an absolute temperature sensor (e.g., thermistor) 366 located proximate to LEDs 304 and PDs 306. Note that although the acronyms FCM and BCM may be used throughout this disclosure, it should be understood that these modules can be made from materials other than crystal, such as plastic, glass, and (in the case of BCM) metal. In addition, although the optical diodes may be referred to as LEDs and PDs throughout this disclosure, it should be understood that other types of optical diodes such as transistor or diode-based circuits that emit and detect light, and have temperature-dependent forward voltage characteristics can also be employed.

Figure 3B:
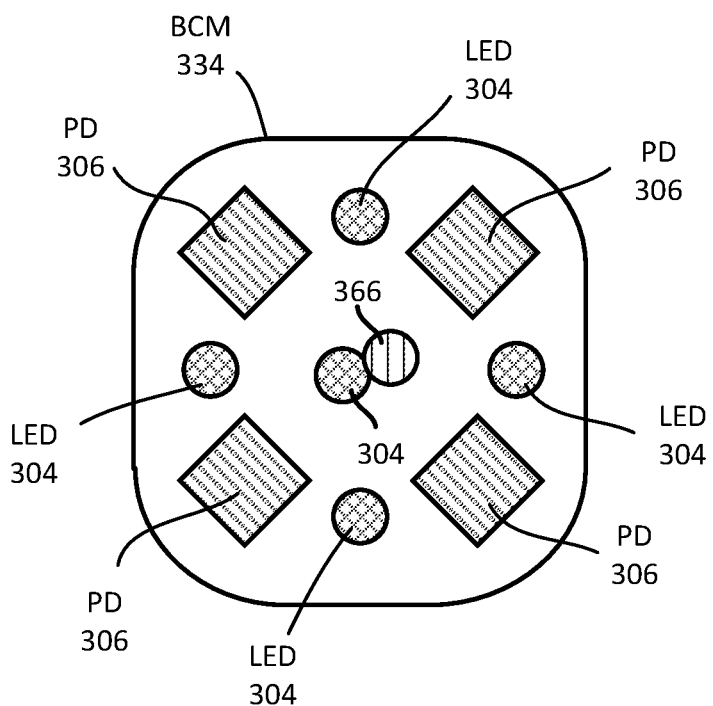
FIG. 3B illustrates a symbolic plan view of a back crystal module (BCM), including a plurality of LEDs and PDs distributed in an array within the BCM according to examples of the disclosure.

FIG. 3B illustrates a symbolic plan view of BCM 334, including a plurality of LEDs 304 and PDs 306 distributed in an array within the BCM according to examples of the disclosure. BCM 334 can also include absolute temperature sensor 366 located at the approximate center of the BCM (where the curvature of the BCM is at its lowest point, and where contact with the user's skin is most reliable). Note that although the example of FIG. 3B shows five LEDs 304 and four PDs 306, any number of one or more LEDs and PDs (optical diodes) may be employed. Note that the placement and size of LEDs 304, PDs 306 and absolute temperature sensor 366 in FIG. 3B is only exemplary, and is not intended to be to scale.

As noted above, LEDs 304 and PDs 306 can be configured to generate and emit light into a user's skin and detect returning light (e.g., reflected and/or scattered) to measure a physiological signal (e.g., a photoplethysmogram, or PPG signal) for biometric sensing. The absorption and/or return of light at different wavelengths can also be used to determine one or more characteristics of the user (e.g., oxygen saturation, heart rate, etc.) and provide biometric and health-related information to the user. Because user temperature can also be a useful health-related parameter, absolute temperature sensors such as sensor 344 and thermistor 366 can be employed with device 328. However, as an alternative to, or in addition to, the use of absolute temperature sensors for user temperature sensing, LEDs 304 and PDs 306 can be used for an additional function besides biometric sensing, and can be configured to perform user temperature sensing according to examples of the disclosure.

Figure 4:
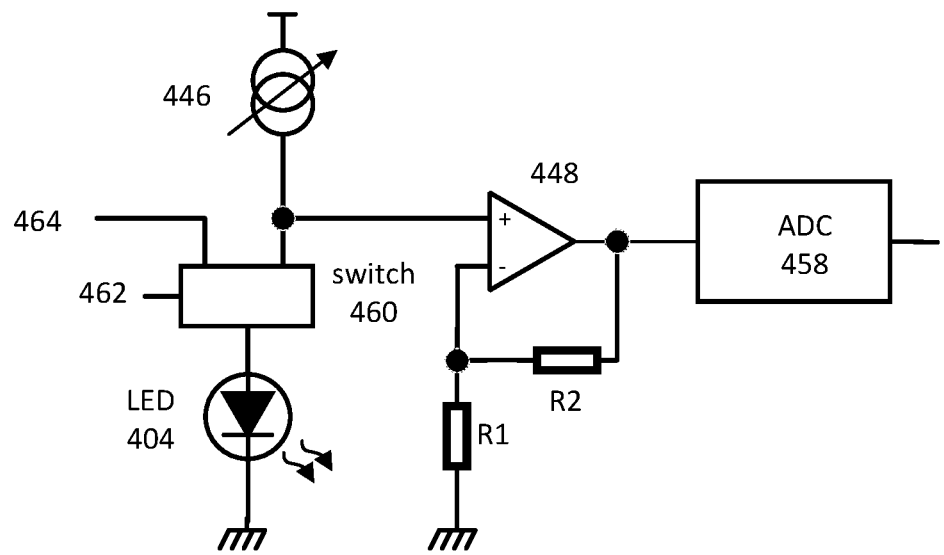
FIG. 4 illustrates a circuit capable of configuring an LED for biometric sensing and for temperature sensing according to examples of the disclosure.

FIG. 4 illustrates a circuit capable of configuring LED 404 for biometric sensing and for temperature sensing according to examples of the disclosure. When configured for biometric sensing, select line 462 can cause switch (e.g., multiplexer) 460 to couple input 464 to LED 404. Input 464 can be coupled to other circuitry (not shown) for selectively forward-biasing LED 404 and causing it to emit light directed towards the user's skin. When configured for temperature sensing, select line 462 can cause switch 460 to couple current circuit (source) 446 to LED 404 and forward bias the LED. Note that current circuit (source) 446 can represent either a single configurable current circuit capable of sourcing current, or multiple current circuits, each capable of sourcing a fixed amount of current. The forward biased LED 404 can be used for temperature sensing because its forward voltage is temperature dependent, as will be explained in greater detail below. Whether the circuit of FIG. 4 is configured for biometric sensing or temperature sensing, the forward voltage (also referred to $V_{BE}$ herein) of LED 404 can be measured by coupling analog front end (AFE) 448 (including feedback and biasing resistors and configured as a single-ended noninverting amplifier) to the LED, and converting the forward voltage to a digital value using analog-to-digital converter (ADC) 458. In other examples, AFE 448 can be configured to perform differential measurements instead of single-ended measurements. Differential measurements can allow for higher accuracy by providing common-mode rejection.

In some examples, when LED 404 is operated in a forward-bias mode with a constant current circuit (source) 446, the LED can have a negative temperature coefficient of about −2 mV/° C. In other words, the forward voltage of LED 404 can decrease by about 2 mV for every degree Celsius increase in temperature. The diode equation can be manipulated in view of the temperature dependence of $V_{BE}$ to compute an estimated temperature. Specifically, the diode equations for two known bias currents are as follows:

$$I_{C1} = I_0 \left( e^{\frac{qV_{BE1}}{\eta kT}} - 1 \right) \quad (1)$$

$$I_{C2} = I_0 \left( e^{\frac{qV_{BE2}}{\eta kT}} - 1 \right) \quad (2)$$

where $I_{C1}$ and $I_{C2}$ (or $I_1$ and $I_2$ as used in later equations) are the two known applied LED bias currents, $I_0$ is the dark saturation current, T is the absolute temperature in Kelvin, $V_{BE}$ is the diode drop/forward voltage, η is the diode ideality factor, k is the Boltzmann constant, and q is the absolute value of the electron charge.

From these two equations, the following can be derived:

$$\Delta V_{BE} = V_{BE2} - V_{BE1} = \frac{\eta kT}{q}\left[\ln\left(\frac{I_2}{I_0}\right)+1\right] - \frac{\eta kT}{q}\left[\ln\left(\frac{I_1}{I_0}\right)+1\right] \quad (3)$$

which implies:

$$\Delta V_{BE} = \eta \frac{kT}{q}\left[\ln\left(\frac{I_2}{I_1}\right)\right] \Rightarrow T = \frac{\Delta V_{BE} \cdot q}{\eta \cdot k} \ln\left(\frac{I_1}{I_2}\right) \quad (4)$$

The ideality factor η in the diode equation is dependent on the relationship between forward voltage, temperature and current, and is therefore related to the negative temperature coefficient. A factory characterization procedure in a controlled temperature environment can be performed after LED 404 is integrated into the BCM to empirically determine two constant bias currents $I_1$ and $I_2$ (and their ratios) and the diode ideality factor η. After the diode ideality factor η is determined, then by applying the different known bias currents to LED 404 and measuring $V_{BE}$ for each current using the circuit of FIG. 4, the difference between $V_{BE}$ measurements ($\Delta V_{BE}$) at the different currents can be computed and applied to equation (4) above. In one example, two different known bias currents $I_1$ and $I_2$ can be applied, and $\Delta V_{BE}$ can be computed after both $V_{BE}$ measurements at the two different currents have been captured by a processor (see FIG. 2) coupled to LED 404 through ADC 458. Because the two applied bias currents $I_1$ and $I_2$ are known, and $\Delta V_{BE}$ has been computed, the temperature T can be computed using equation (4). This process can be repeated for a plurality of LEDs 404 on the device, and the plurality of temperature computations at the plurality of LED locations can thereafter be used to estimate the temperature of a user.

As mentioned above, each LED 304 in the examples of FIGS. 3A and 3B can include multiple LEDs (e.g., red, green and IR LEDs), and in some examples five LEDs 304 may be present on a device. In some examples, a temperature can be estimated according the discussion of FIG. 4 above for one LED in each of the plurality of LED 304 (e.g., each red LED in each LED 304). However, in other examples, a temperature can be estimated according to the discussion of FIG. 4 above for a plurality of the LEDs in each of the plurality of LEDs 304 (e.g., for the red, green and IR LEDs in each LED 304). In some examples, a separate AFE 448 and ADC 458 pair can be coupled to each LED 404 as shown in FIG. 4. However, in other examples, a plurality of LEDs 404 can be measured by a single AFE/ADC pair (or at least fewer AFE/ADC pairs than there are LEDs to be measured), by multiplexing the LEDs so that a single LED is coupled to a single AFE/ADC pair at any one time.

Figure 5:
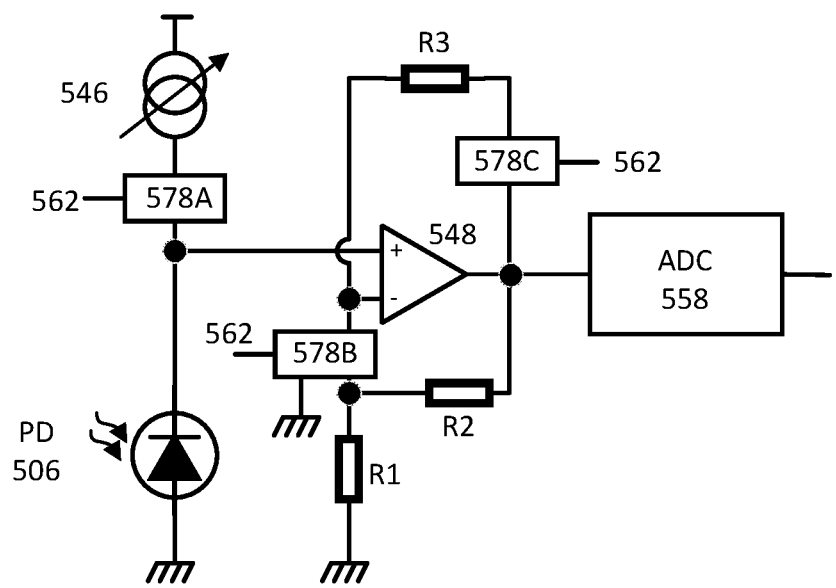
FIG. 5 illustrates a circuit capable of configuring a PD for biometric sensing and for temperature sensing according to examples of the disclosure.

FIG. 5 illustrates a circuit capable of configuring PD 506 for biometric sensing and for temperature sensing according to examples of the disclosure. When configured for biometric sensing, select line 562 can cause switch 578A to open and disconnect current circuit (sink) 546 from the circuit, cause switch 578B to disconnect the feedback path to the inverting input of amplifier 548 and instead connect the inverting input to R3, and cause switch 578C to close to provide a resistive feedback path (symbolized by resistor R3) to the inverting input of the amplifier. As shown in FIG. 5, PD 506 is intended to operate in a photoconductive reverse-biased mode when utilized for biometric sensing. When reflected light impinges on PD 506, the current through the PD can increase linearly with increasing optical power. The change in current can be detected by AFE 548 and digitized in ADC 558. When configured for temperature sensing, select line 562 can cause switch 578A to close and couple current circuit (sink) 546 to PD 506 and forward bias PD 506 so that the PD operates in photoconductive forward-biased mode, cause switch 578B to connect the feedback path (including symbolic resistors R1 and R2) to the inverting input of amplifier 548 and remove the connection to ground, and cause switch 578C to open and disconnect the R3 feedback path to the inverting input of the amplifier. Note that current circuit (sink) 546 can represent either a single configurable current circuit capable of sinking current, or multiple current circuits, each capable of sinking a fixed amount of current. The forward biased PD 506 can be used for temperature sensing because its forward voltage is temperature dependent, as will be explained in greater detail below. Whether the circuit of FIG. 5 is configured for biometric sensing or temperature sensing, the forward voltage (also referred to $V_{BE}$ herein) of PD 506 can be measured by AFE 548 (including feedback and biasing resistors) configured as a single-ended noninverting amplifier, and converted to a digital value using ADC 558. In other examples, AFE 548 can be configured to perform differential measurements instead of single-ended measurements. Differential measurements can allow for higher accuracy by providing common-mode rejection.

In some examples, when PD 506 is operated in a forward-bias mode with a constant current circuit (sink) 546, the PD can have a negative temperature coefficient of about −2 mV/° C., similar to that of the LED. In other words, the forward voltage of PD 506 can decrease by about 2 mV for every degree Celsius increase in temperature. The diode equation can be manipulated in view of the temperature dependence of $V_{BE}$ to compute an estimated temperature. Equations (1)-(4) as discussed above are also applicable to the PD circuit of FIG. 5, except that some of the constants will be different. For example, $I_0$ and $V_{BE}$ may depend on the type of diode (e.g., silicon vs. germanium) and the fabrication of those diodes during the manufacturing process.

The ideality factor η in the diode equation is dependent on the relationship between forward voltage, temperature and current, and is therefore related to the negative temperature coefficient. A factory characterization procedure can be performed after PD 506 is integrated into the BCM to empirically determine the diode ideality factor η. After the diode ideality factor q is determined, then by applying different known currents to PD 506 and measuring $V_{BE}$ for each current using the circuit of FIG. 5, the difference between $V_{BE}$ measurements ($\Delta V_{BE}$) at the different currents can be computed and applied to equation (4) above. In one example, two different known bias currents $I_1$ and $I_2$ can be applied, and $\Delta V_{BE}$ can be computed after both $V_{BE}$ measurements at the two different currents have been captured by a processor (see FIG. 2) coupled to PD 506 through ADC 558. Because the two applied bias currents $I_1$ and $I_2$ are known, and $\Delta V_{BE}$ has been computed, the temperature T can be computed using equation (4). This process can be repeated for a plurality of PDs 506 on the device, and the plurality of temperature computations at the plurality of PD locations can thereafter be used to estimate the temperature of a user.

In some examples, a separate AFE 548 and ADC 558 pair can be connected to each PD 506 as shown in FIG. 5. However, in other examples, a plurality of PDs 506 can be measured by a single AFE/ADC pair (or at least fewer AFE/ADC pairs than there are PDs to be measured), by multiplexing the PDs so that a single PD is connected to a single AFE/ADC pair at any one time. In other examples, the LEDs 404 and PDs 506 of FIGS. 4 and 5, respectively, can be multiplexed to so that they can be measured by a single AFE/ADC pair (or at least fewer AFE/ADC pairs than there are LEDs and PDs to be measured), by multiplexing the LEDs and PDs so that a single LED or PD is connected to a single AFE/ADC pair at any one time.

As described above, for each LED or PD (optical diode) to be measured, two different known bias currents are applied, $V_{BE}$ can be measured for each current, and $\Delta V_{BE}$ can be computed and applied to equation (4) above to determine the temperature. Because temperature typically does not change rapidly, the two current measurements can be done relatively slowly, and the frequency of measurement can be determined based at least in part on the thermodynamic behavior of the system, and power consumption considerations. In one example, the two measurements can be performed at a rate of 2-5 Hz.

Returning again to FIG. 3B, one advantage of utilizing multiple LEDs 304 or multiple PDs 306 in estimating the temperature of a user is that the LEDs and PDs (the optical diodes), and therefore the temperature estimates, can be distributed throughout the device, and not reliant on just a single estimate from a single LED or PD. Using temperature estimates from an array of LEDs or PDs can allow for certain user behaviors or conditions to be calibrated out of the estimates. For example, if the device is a watch but the watch band is loose and not making consistent contact with the user's wrist, some time-dependent contact may occur between the LEDs and/or PDs and the user's wrist. In addition, the curvature of the side of the watch making contact with the user's wrist (see, e.g., FIG. 3A) can introduce some location-dependent contact variations between the LEDs and/or PDs and the user's wrist. Despite these inconsistencies, plural distributed temperature sensing capabilities can permit the detection of certain user behaviors or device conditions and compensate the calculated temperature estimates for these behaviors and conditions.

Figure 6:
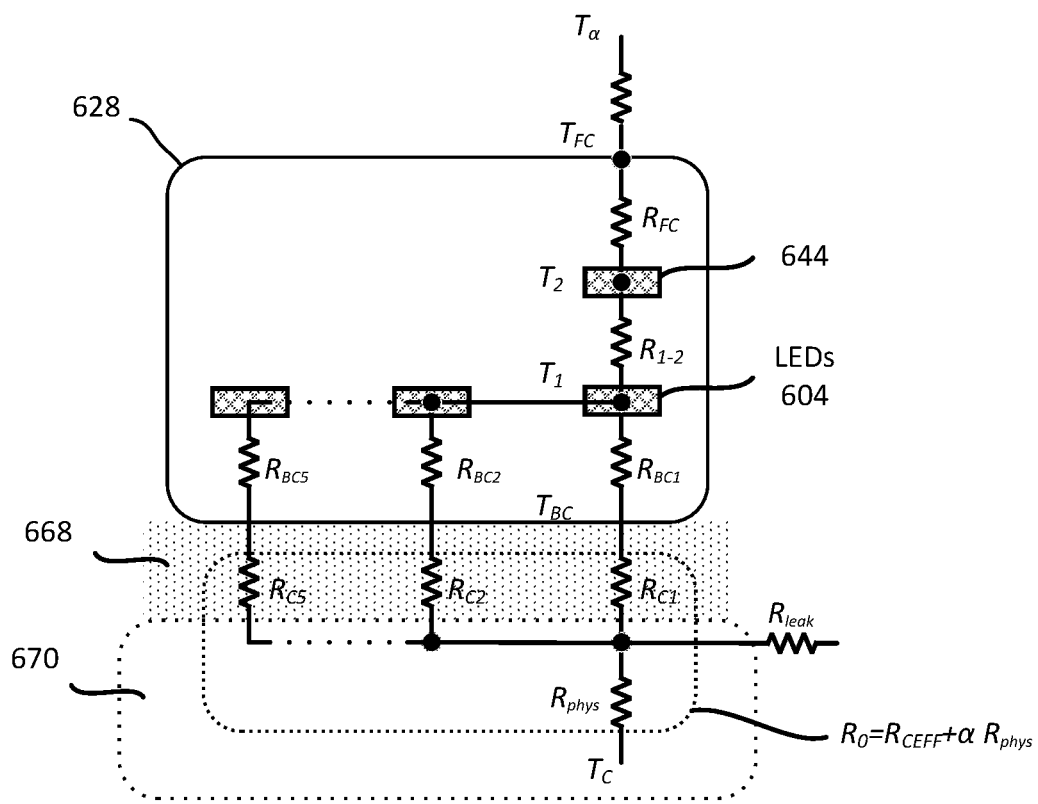
FIG. 6 illustrates an equivalent circuit model of a device having five LEDs for temperature estimation of a user in contact with the device according to examples of the disclosure.

FIG. 6 illustrates an equivalent circuit model of a device having five LEDs for temperature estimation of a user in contact with the device according to examples of the disclosure. In the example of FIG. 6, device 628 includes five LEDs 604 and absolute temperature sensor 644, and the lower surface of the device (e.g., the back crystal (BC)) is in contact with user 670 through contact interface 668. However, in other examples a different number of LEDs 604 can be employed. Contact interface 668 can represent the thermal resistance between the BC of device 628 and user 670. In some examples, the thermal resistance between each xth LED 604 and user 670 includes a thermal resistance of the BC designated as $R_{BCx}$ plus a thermal resistance of the contact interface designated as $R_{Cx}$. Accordingly, the thermal resistance between each of five LEDs 604 and user 670, through the BC of device 628 and contact interface 668, can be represented by $R_{BC1}+R_{C1}$ through $R_{BC5}+R_{C5}$, respectively. Note that the thermal resistance $R_{BCx}$ for each LED 604 can vary depending on the thickness of the BC at each LED location.

The parallel thermal resistance of $R_{BC1}$ through $R_{BC1}$ can be designated $R_{BC}$, and the parallel thermal resistance of $R_{C1}$ through $R_{C1}$ can be designated $R_{CEFF}$. In some examples, the thermal resistance between the array of LEDs 604 and absolute temperature sensor 644 can be designated $R_{1-2}$, and the thermal resistance between absolute temperature sensor 644 and the front crystal (FC) surface of device 628 can be designated $R_{FC}$. In addition, in some examples the thermal resistance between the surface of user 670 and the desired corrected user temperature $T_C$ can be designated $R_{phys}$, and the leakage thermal resistance between the surface of device 628 and the surface of user 670 through contact interface 668 can be designated $R_{leak}$. In some examples, the equivalent resistance of $R_{CEFF}+\alpha R_{phys}$ is $R_0$, where $\alpha$ is a constant. In some examples, the temperature at the BC of device 628 can be designated $T_{BC}$, the temperature at LEDs 604 can be designated $T_1$, the temperature at absolute temperature sensor 644 can be designated $T_2$, the temperature at the surface of the front crystal can be designated $T_{FC}$, and the ambient temperature can be designated $T_\alpha$.

The corrected user temperature $T_C$ can be represented by:

$$T_C=T_1+c_0(T_1-T_2) \quad (5)$$

where $$c_0=(R_{BC}/R_{1-2})+(R_0/R_{1-2}) \quad (6)$$

To obtain an accurate user temperature $T_C$, the temperature $T_1$ should ideally be as close as possible to $T_{BC}$, which is true when $c_0$ is very small. When the parallel thermal resistance $R_{BC}$ is low and the equivalent thermal resistance $R_0$ is low, $c_0$ can be very small. By placing multiple LEDs 604 in the BC of device 628, and utilizing these LEDs to estimate temperature, the effective BC thermal resistance $R_{BC}$ and effective contact interface thermal resistance $R_{CEFF}$ (and therefore $R_0$) can be reduced. In essence, FIG. 6 and equations (5) and (6) illustrate the benefits of reducing the thermal resistance of the BC and contact interface 668 when using LEDs 604 to estimate user temperature.

It should be noted that although FIG. 6, equations (5) and (6) and the associated discussion above are illustrated and described from the perspective of an array of LEDs (see FIGS. 3B and 4), in other examples a similar circuit diagram and equations are applicable to an array of PDs (see FIGS. 3B and 5), and are applicable to optical diodes generally. Reducing the thermal resistance of the BC and contact interface 668 is similarly beneficial when using PDs to estimate user temperature.

Figure 7:
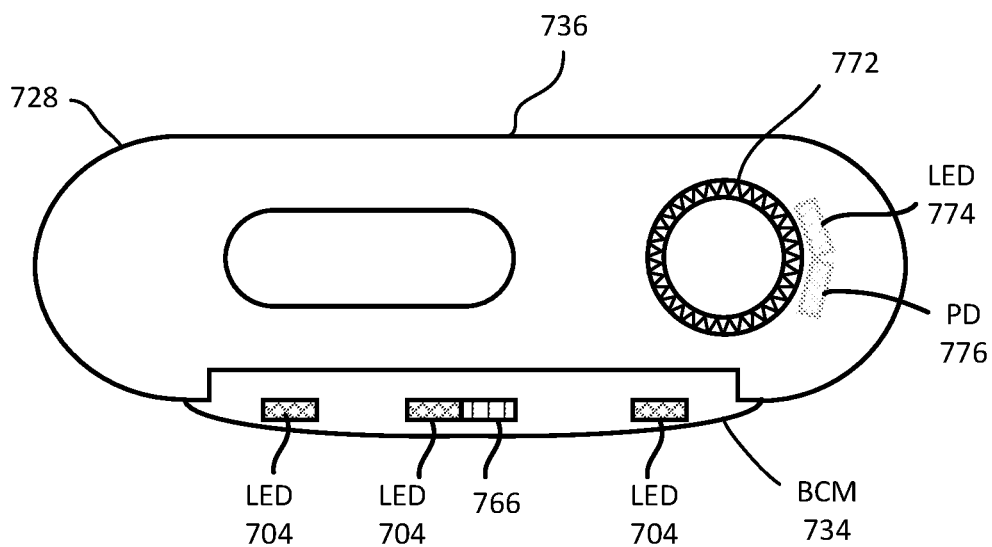
FIG. 7 illustrates a symbolic side view of an example device (e.g., a watch) with an alternative arrangement for providing an absolute temperature sensor for use with LEDs and/or PDs configured for user temperature estimation according to examples of the disclosure.

FIG. 7 illustrates a symbolic side view of an example device 728 (e.g., a watch) with an alternative arrangement for providing an absolute temperature sensor for use with LEDs and/or PDs (optical diodes) configured for user temperature estimation according to examples of the disclosure. In some examples, device 728 can include front crystal module (FCM) 736. In some examples, device 728 can also include back crystal module (BCM) 734 having LEDs 704 and PDs (not shown in FIG. 7) that are configurable for estimating a user's temperature according to examples of the disclosure. LEDs 704 and the PDs can correspond to light emitters 204 and light detectors 206 shown in FIG. 2 and described above. Although not shown in FIG. 7, in some examples each LED 704 can represent a cluster of multiple LEDs, and each cluster can include, but is not limited to, red, green and infrared (IR) LEDs. However, unless otherwise indicated, the term "LED" as utilized herein is a reference to one LED, even though LED 704 can contain a cluster of LEDs. Device 728 can also include absolute temperature sensor (e.g., thermistor) 766.

FIG. 7 also illustrates an optional crown 772, which can include LED 774 and PD 776 (optical diodes) located internal to device 728 (shown greyed-out to illustrate that fact) and coupled to a processor for detecting rotations and/or other movements (e.g., axial depressions) of the crown. Note that the placement of LED 774 and PD 776 in FIG. 7 is merely symbolic, and is not intended to be representative of their actual locations with respect to crown 772. In some examples of the disclosure, rather than employing a separate standalone absolute temperature sensor (see, e.g., absolute temperature sensor 344 in FIG. 3A, or absolute temperature sensor 644 in FIG. 6), LED 774 and PD 776 can be made configurable as shown in FIGS. 4 and 5 to perform both rotation detection (for example) and also temperature estimation. Utilizing LED 774 and PD 776 for both rotation detection and temperature estimation can advantageously eliminate the need for a separate absolute temperature sensor. Because LED 774 and PD 776 are in a different physical location within device 728 as compared to absolute temperature sensor 344 in FIG. 3A, thermal resistances $R_{1-2}$ and $R_{FC}$ will be different as compared to those shown in FIG. 6, but otherwise the circuit model of FIG. 6 is generally applicable to the configuration of FIG. 7.

In another example of the disclosure, one LED 704 or PD (one optical diode) in BCM 734 can be used along with one LED 774 or PD 776 (one optical diode) in crown 772 as absolute temperature sensors, eliminating the need for absolute temperature sensors 344 and 366 as shown in FIG. 3A. In this example, these absolute temperature sensors can be coupled to a processor to obtain temperature estimates. The temperature estimates from both absolute temperature sensors, in combination with the thermal resistance between them, can be used to estimate a corrected user temperature $T_C$, without the need for an array of LEDs 704 or PDs.

Referring again to FIGS. 3A and 3B, in some examples, absolute temperature sensor (e.g., thermistor) 366 can provide a reference temperature measurement that is not dependent on an LED or PD (optical diode). To ensure that absolute temperature sensor 366 provides accurate readings, it can be placed near the bottom of the curvature of BCM 334 (e.g., near the center of BCM 334 as shown in FIG. 3B) where contact with the user's skin is most likely. This reference temperature measurement can be used to calibrate the temperature estimates derived from the LEDs 304 and/or PDs 306. In one example, a calibration procedure can be performed to compute the difference between the reference temperature measurement and the temperature estimate generated from each LED 304 or PD 306 under controlled conditions. For example, controlled conditions can be produced by maintaining the device at a known temperature with no airflow, and ensuring that consistent contact is being maintained between the BCM and an object. Temperature differences can be computed, stored as offsets, and subtracted from subsequent LED or PD temperature estimates to calibrate the estimates.

In some examples, when LEDs and PDs (optical diodes) are integrated into a printed circuit board (PCB), a bonding adhesive can be applied under the PCB to improve strength and reliability. In some examples, an encapsulation epoxy can also be applied over LEDs, PDs and PCB. Because these adhesives and epoxies can have different temperature and/or humidity characteristics (e.g., different coefficients of thermal expansion), the LEDs and PDs are often under different levels of thermal strain or other coupling forces. This thermal strain can affect the accuracy of the temperature estimates, both in the short term and over the lifetime of the device. The thermal strain can also exhibit hysteresis, in which the thermal strain can be present even after the ambient temperature has stabilized. This thermal hysteresis can cause errors in temperature estimates that persist well after the temperature has stabilized.

To compensate for the effects of thermal strain or other coupling forces, in some examples a procedure can be performed to compute the differences between the temperature estimates generated from each LED 304 or PD 306 under controlled conditions. For example, controlled conditions can be produced by maintaining the device at a known temperature with no airflow, and ensuring that consistent contact is being maintained between the BCM and an object. Under these conditions, the temperature estimates should be approximately the same across the LEDs or PDs. Any computed differences can be attributed to strain. In some examples, an average temperature estimate can be computed, and those temperature estimates that vary from the average by greater than a threshold amount can be discarded. In other examples, individual variations from the average can be saved as strain offsets, and applied to subsequent temperature estimates to calibrate those estimates for thermal strain.

Figure 8:
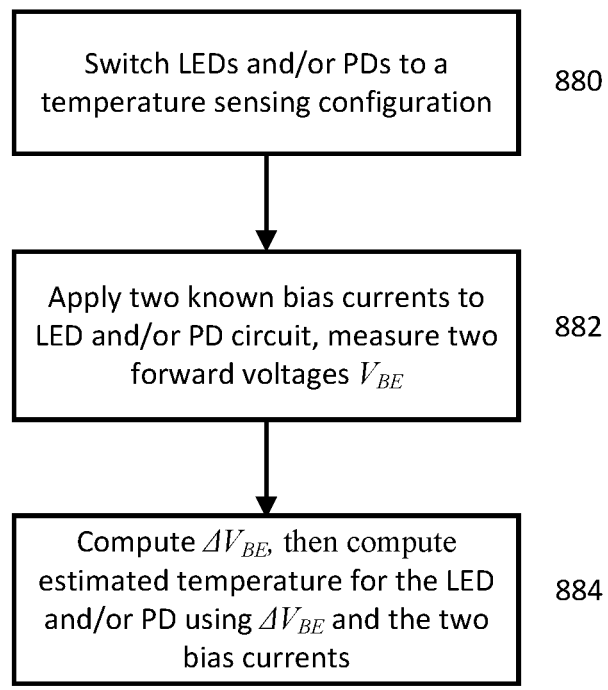
FIG. 8 illustrates a process for distributed temperature sensing according to examples of the disclosure.

FIG. 8 illustrates a process for distributed temperature sensing according to examples of the disclosure. The blocks illustrated in FIG. 8 can be performed by the computing system of FIG. 2 and hardware of FIGS. 3A, 3B and 4-7. In the example of FIG. 8, a plurality of LEDs and/or PDs (optical diodes) can be switched from a biometric sensing configuration to a temperature sensing configuration at 880. For each LED or PD, two known bias currents can be applied to forward-bias the LED or PD, and the forward voltage across the LED or PD can be measured at 882. The difference between the measured forward voltages, $\Delta V_{BE}$, can be computed and applied, along with the know bias currents, to equation (4) above, to determine an estimated user temperature at each LED or PD at 884.

Referring again to FIG. 6, as noted above, the thermal resistance between each of five LEDs 604 and user 670, through the BC of device 628 and contact interface 668, can be represented by $R_{BC1}+R_{C1}$ through $R_{BC5}+R_{C5}$, respectively. These thermal resistances can be similar when there is consistent contact between each of the LEDs 604 and user 670, but if the contacts are not consistent due to a loose or irregular fit between device 628 and the user, or if there is significant curvature at the area of the device contacting the user (see FIG. 3A), the temperature estimated at each of the LEDs can vary. To account for this variation, in some examples of the disclosure the temperature estimated at each of the LEDs 604 can be averaged. In other examples, a single estimated temperature (e.g., the highest, lowest or median estimated temperature) can be used while all others are discarded, the highest and lowest estimated temperatures can be discarded and all others averaged, or a selected plurality of estimated temperature readings can be averaged (e.g., those estimated temperatures that are within a predetermined range of each other, or a predetermined number of the highest or lowest estimated temperatures) while others are discarded.

In some examples, multiple estimated temperature computations can be performed and captured for one or more of the plurality of LEDs or PDs (optical diodes) in a device over a period of time. These accumulated estimated temperature computations, optionally along with other captured sensor data, can then be analyzed, and if certain criteria are satisfied, the accumulated estimated temperatures and/or future estimated temperature determinations can be discarded, calibrated, averaged, selectively utilized or otherwise processed to obtain a corrected estimated user temperature, or other actions can be performed.

Figure 9:
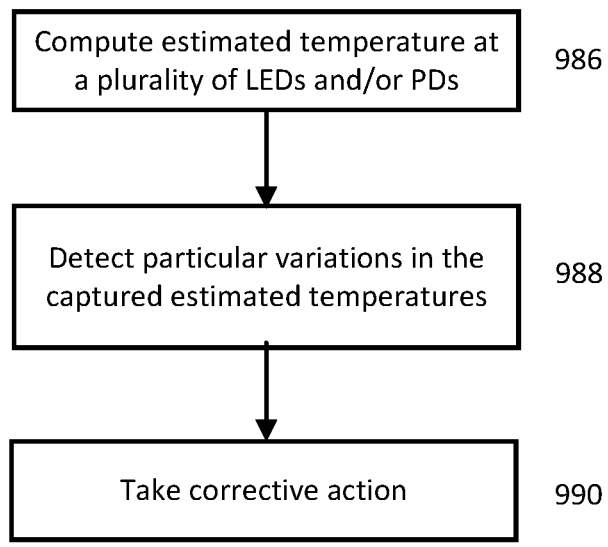
FIG. 9 illustrates a process for determining and utilizing user temperatures estimated from an array of LEDs or PDs according to examples of the disclosure.

FIG. 9 illustrates a process for determining and utilizing user temperatures estimated from an array of LEDs or PDs (optical diodes) according to examples of the disclosure. The blocks illustrated in FIG. 9 can be performed by the computing system of FIG. 2 and hardware of FIGS. 3A, 3B and 4-7. In the example of FIG. 9, estimated temperatures can be computed and captured for each of a plurality of LEDs or PDs over a period of time at 986. Temperatures can be estimated at each LED or PD in accordance with the circuits of FIGS. 4 and 5 and equation (4) as described above.

Particular variations in the captured estimated temperatures can be detected at 988. In some examples, these variations can include spatial variations, such as variations in estimated temperatures that exceed some comparison temperature by a particular threshold occurring in a particular region of a device (e.g., on one side of a device). For example, if a predetermined number of estimated temperatures from LEDs or PDs considered to be located on one "band side" of a watch (e.g., one side of a watch where a watchband is attached) vary more than a threshold amount from a predetermined number of estimated temperatures from LEDs or PDs considered to be located on the other side of the watch (e.g., the opposite side where the other end of the watchband is attached), that can be an indication that the watch has rotated on the wearer's wrist, creating a gap between the wrist and one side of the BCM.

If a particular condition is detected, a corrective action can be performed at 990. For example, if watch rotation is detected, some or all of the estimated temperatures can be ignored, and/or a message can be conveyed to the wearer of the watch that the watch may be in need of rotation about the wrist to provide a better fit (and provide better temperature and/or biometric sensing).

In some examples, these variations can include directional variations, such as variations in estimated temperatures that exceed some comparison temperature by a particular threshold occurring in a particular direction. For example, if estimated temperatures from a predetermined number of LEDs or PDs considered to be facing a particular direction (e.g., north, as determined by orientation sensors) vary more than a threshold amount from the estimated temperatures from a predetermined number of LEDs or PDs facing a different direction (e.g., south), this can be an indication that a directional thermal source (e.g., a heater, the sun, or a hot northeast wind) or thermal sink (e.g., an air conditioner, or a cold northwest wind) is present in the particular direction. In that instance, some or all of the estimated temperatures can be ignored, or calibrated to account for these conditions.

In some examples, these variations can include temporal variations, such as variations in estimated temperatures across the array of LEDs or PDs that exceed some comparison temperature by a particular threshold occurring at a certain time. For example, if estimated user temperatures vary within individual LEDs or PDs beyond a certain threshold at about the same time as a predetermined amount of watch movement is detected (e.g., from motion and/or orientation sensors), this can be an indication that the watch is sliding along the wearer's wrist. In that instance, the estimated user temperatures can be discarded, and/or a message can be conveyed to the wearer of the watch that the band is loose and may need tightening to provide a better fit (and provide better temperature and/or biometric sensing).

As the above examples illustrate, any number of actions can be taken by combining estimated temperatures from LEDs and/or PDs with other information. Although the examples described above relate to watches, it should be apparent that similar or other examples can be applicable to other devices.

Therefore, according to the above, some examples of the disclosure are directed to an electronic device for distributed user temperature sensing, comprising a plurality of optical diodes arranged about the device, each optical diode coupled to a switch that is selectable to configure the coupled optical diode for user temperature sensing, one or more current circuits selectively couplable to each optical diode through the coupled switch when the optical diode is configured for user temperature sensing, the one or more current circuits configured for separately applying at least two different bias currents to the optical diode at different times, an amplifier couplable to each optical diode, the amplifier configured for measuring a forward voltage of the optical diode when each of the at least two different bias currents are separately applied to the optical diode, and a processor coupled to the amplifier for each optical diode and configured for estimating a user temperature from the optical diode based on the at least two different bias currents and the measured forward voltages of the optical diode when each of the at least two different bias currents are separately applied. Additionally or alternatively to one or more of the examples disclosed above, in some examples the switch for each optical diode is further selectable to configure the coupled optical diode for biometric sensing. Additionally or alternatively to one or more of the examples disclosed above, in some examples the plurality of optical diodes includes a plurality of light emitting diodes (LEDs), each LED forward-biased for both biometric sensing and user temperature sensing. Additionally or alternatively to one or more of the examples disclosed above, in some examples the plurality of optical diodes includes a plurality of photodiodes (PDs), each PD reverse-biased for biometric sensing and forward-biased for user temperature sensing. Additionally or alternatively to one or more of the examples disclosed above, in some examples the processor further configured for capturing a plurality of estimated user temperatures from each of the plurality of optical diodes, detecting a spatial variation in the plurality of estimated user temperatures, and in accordance with a determination that the detected spatial variation satisfies a spatial variation criterion, performing a corrective action. Additionally or alternatively to one or more of the examples disclosed above, in some examples the processor is further configured for capturing a plurality of estimated user temperatures from each of the plurality of optical diodes, detecting a directional variation in the plurality of estimated user temperatures, and in accordance with a determination that the detected directional variation satisfies a directional variation criterion, performing a corrective action. Additionally or alternatively to one or more of the examples disclosed above, in some examples the processor is further configured for capturing a plurality of estimated user temperatures from each of the plurality of optical diodes, averaging the captured plurality of estimated user temperatures, for each of the plurality of optical diodes, storing a difference between the estimated user temperature computed from the optical diode and the average as an offset, and applying the offset to subsequent estimated user temperatures. Additionally or alternatively to one or more of the examples disclosed above, in some examples the electronic device further comprises a first absolute temperature sensor located proximate the plurality of optical diodes, the first absolute temperature sensor configured to provide an absolute user temperature measurement, wherein the processor is further configured for calibrating the estimated user temperature derived from each of the plurality of optical diodes using the absolute user temperature measurement. Additionally or alternatively to one or more of the examples disclosed above, in some examples the processor is further configured to estimate the user temperature from each of the plurality of optical diodes according to:

$$T = \frac{\Delta V_{BE} \cdot q}{\eta \cdot k} \ln\left(\frac{I_1}{I_2}\right)$$

wherein $I_1$ and $I_2$ are the two bias currents, T is absolute temperature in Kelvin, $\Delta V_{BE}$ is a difference in the measured forward voltage of the optical diode for each of the two applied bias currents, $\eta$ is an optical diode ideality factor, k is a Boltzmann constant, and q is an absolute value of electron charge. Additionally or alternatively to one or more of the examples disclosed above, in some examples at least one of the plurality of optical diodes comprises a first absolute user temperature sensor formed within a first area of the device intended for contact with a user, the first absolute user temperature sensor configured to provide a first absolute user temperature measurement, and wherein at least one of the plurality of optical diodes comprises a second absolute temperature sensor formed within a second area of the device different from the first area, the second absolute temperature sensor configured to provide a second absolute device temperature measurement. Additionally or alternatively to one or more of the examples disclosed above, in some examples the electronic device includes an input mechanism in the second area of the device, the input mechanism including at least one of the plurality of optical diodes that is configurable for rotational input detection or as the second absolute device temperature sensor.

Some examples of the disclosure are directed to a method for distributed user temperature sensing, comprising selectively configuring each of a plurality of optical diodes arranged about a device for user temperature sensing, and upon configuring each of the plurality of optical diodes for user temperature sensing, applying at least two bias currents to each coupled optical diode at different times, measuring a forward voltage of each of the plurality of optical diodes when each of the at least two bias currents are separately applied to each of the plurality of optical diodes, and estimating a user temperature from each optical diode based on the at least two different bias currents and the measured forward voltages of the optical diode when each of the at least two different bias currents are separately applied. Additionally or alternatively to one or more of the examples disclosed above, in some examples the method further comprises selectively configuring each of the plurality of optical diodes for biometric sensing. Additionally or alternatively to one or more of the examples disclosed above, in some examples the plurality of optical diodes comprise a plurality of light-emitting diodes (LEDs), and the method further comprises forward-biasing each of the plurality of LEDs for both biometric sensing and user temperature sensing. Additionally or alternatively to one or more of the examples disclosed above, in some examples the plurality of optical diodes comprises photodiodes (PDs), and the method further comprises reverse-biasing each of the plurality of PDs for biometric sensing and forward-biasing each of the plurality of PDs for user temperature sensing. Additionally or alternatively to one or more of the examples disclosed above, in some examples the method further comprises capturing a plurality of estimated user temperatures from each of the plurality of optical diodes, detecting a spatial variation in the plurality of estimated user temperatures, and in accordance with a determination that the detected spatial variation satisfies a spatial variation criterion, performing a corrective action. Additionally or alternatively to one or more of the examples disclosed above, in some examples the method further comprises capturing a plurality of estimated user temperatures from each of the plurality of optical diodes, detecting a directional variation in the plurality of estimated user temperatures, and in accordance with a determination that the detected directional variation satisfies a directional variation criterion, performing a corrective action. Additionally or alternatively to one or more of the examples disclosed above, in some examples the method further comprises capturing a plurality of estimated user temperatures from each of the plurality of optical diodes, averaging the captured plurality of estimated user temperatures, for each of the plurality of optical diodes, storing a difference between the estimated user temperature computed from the optical diode and the average as an offset, and applying the offset to subsequent estimated user temperatures. Additionally or alternatively to one or more of the examples disclosed above, in some examples the method further comprises obtaining an absolute user temperature measurement, and calibrating the estimated user temperature derived from each of the plurality of optical diodes using the absolute user temperature measurement. Additionally or alternatively to one or more of the examples disclosed above, in some examples the method further comprises estimating the user temperature from each of the plurality of optical diodes according to:

$$T = \frac{\Delta V_{BE} \cdot q}{\eta \cdot k} \ln\left(\frac{I_1}{I_2}\right)$$

wherein $I_1$ and $I_2$ are the two bias currents, T is absolute temperature in Kelvin, $\Delta V_{BE}$ is a difference in the measured forward voltage of the optical diode for each of the two applied bias currents, $\eta$ is an optical diode ideality factor, k is a Boltzmann constant, and q is an absolute value of electron charge. Additionally or alternatively to one or more of the examples disclosed above, in some examples the method further comprises performing a characterization procedure to determine the optical diode ideality factor $\eta$. Additionally or alternatively to one or more of the examples disclosed above, in some examples the method further comprises selectively configuring at least one of the plurality of optical diodes within a first area of the device intended for contact with a user as a first absolute temperature sensor, generating a first absolute device temperature measurement at the first absolute temperature sensor, selecting configuring at least one of the plurality of optical diodes within a second area of the device different from the first area as a second absolute temperature sensor, and generating a second absolute device temperature measurement at the second absolute temperature sensor. Additionally or alternatively to one or more of the examples disclosed above, in some examples the method further comprises selectively configuring an input mechanism in the second area of the device including at least one of the plurality of optical diodes for rotational input detection or as the second absolute temperature sensor.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An electronic device for distributed user temperature sensing, comprising:
   a plurality of optical diodes arranged about the electronic device, each optical diode coupled to a switch that is selectable to configure the coupled optical diode for user temperature sensing;
   one or more current circuits selectively couplable to each optical diode through the coupled switch when the optical diode is configured for user temperature sensing, the one or more current circuits configured for separately applying at least two different bias currents to the optical diode at different times;
   an amplifier couplable to each optical diode, the amplifier configured for measuring a forward voltage of the optical diode when each of the at least two different bias currents are separately applied to the optical diode; and
   a processor coupled to the amplifier for each optical diode and configured for estimating a user temperature from the optical diode based on the at least two different bias currents and the measured forward voltages of the optical diode when each of the at least two different bias currents are separately applied.

2. The electronic device of claim 1, wherein the switch for each optical diode is further selectable to configure the coupled optical diode for biometric sensing.

3. The electronic device of claim 1, wherein the plurality of optical diodes includes a plurality of light emitting diodes (LEDs), each LED forward-biased for both biometric sensing and user temperature sensing.

4. The electronic device of claim 1, wherein the plurality of optical diodes includes a plurality of photodiodes (PDs), each PD reverse-biased for biometric sensing and forward-biased for user temperature sensing.

5. The electronic device of claim 1, the processor further configured for:
   capturing a plurality of estimated user temperatures from each of the plurality of optical diodes;
   detecting a spatial variation in the plurality of estimated user temperatures; and
   in accordance with a determination that the detected spatial variation satisfies a spatial variation criterion, performing a corrective action.

6. The electronic device of claim 1, the processor further configured for:
   capturing a plurality of estimated user temperatures from each of the plurality of optical diodes;
   detecting a directional variation in the plurality of estimated user temperatures; and
   in accordance with a determination that the detected directional variation satisfies a directional variation criterion, performing a corrective action.

7. The electronic device of claim 1, the processor further configured for:
   capturing a plurality of estimated user temperatures from each of the plurality of optical diodes;
   averaging the captured plurality of estimated user temperatures;
   for each of the plurality of optical diodes, storing a difference between the estimated user temperature computed from the optical diode and the average as an offset; and
   applying the offset to subsequent estimated user temperatures.

8. The electronic device of claim 1, further comprising a first absolute temperature sensor located proximate the plurality of optical diodes, the first absolute temperature sensor configured to provide an absolute user temperature measurement;
   wherein the processor is further configured for calibrating the estimated user temperature derived from each of the plurality of optical diodes using the absolute user temperature measurement.

9. The electronic device of claim 1, wherein the processor is further configured to estimate the user temperature from each of the plurality of optical diodes according to:

$$T = \frac{\Delta V_{BE} \cdot q}{\eta \cdot k} \ln\left(\frac{I_1}{I_2}\right)$$

wherein $I_1$ and $I_2$ are the at least two different bias currents, T is absolute temperature in Kelvin, $\Delta V_{BE}$ is a difference in the measured forward voltage of the optical diode for each of the at least two different bias currents applied to the optical diode, $\eta$ is an optical diode ideality factor, k is a Boltzmann constant, and q is an absolute value of electron charge.

10. The electronic device of claim 1, wherein at least one of the plurality of optical diodes comprises a first absolute user temperature sensor formed within a first area of the electronic device intended for contact with a user, the first absolute user temperature sensor configured to provide a first absolute user temperature measurement; and
    wherein at least one of the plurality of optical diodes comprises a second absolute temperature sensor formed within a second area of the electronic device different from the first area, the second absolute temperature sensor configured to provide a second absolute device temperature measurement.

11. The electronic device of claim 10, the electronic device including an input mechanism in the second area of the electronic device, the input mechanism including at least one of the plurality of optical diodes that is configurable for rotational input detection or as the second absolute temperature sensor.

12. A method for distributed user temperature sensing, comprising:
    selectively configuring each of a plurality of optical diodes arranged about a device for user temperature sensing; and
    upon configuring each of the plurality of optical diodes for user temperature sensing,
    applying at least two different bias currents to each coupled optical diode at different times,
    measuring a forward voltage of each of the plurality of optical diodes when each of the at least two different bias currents are separately applied to each of the plurality of optical diodes, and
    estimating a user temperature from each optical diode based on the at least two different bias currents and the measured forward voltages of the optical diode when each of the at least two different bias currents are separately applied.

13. The method of claim 12, further comprising selectively configuring each of the plurality of optical diodes for biometric sensing.

14. The method of claim 12, the plurality of optical diodes comprising a plurality of light-emitting diodes (LEDs), the method further comprising forward-biasing each of the plurality of LEDs for both biometric sensing and user temperature sensing.

15. The method of claim 12, the plurality of optical diodes comprising a plurality of photodiodes (PDs), the method further comprising reverse-biasing each of the plurality of PDs for biometric sensing and forward-biasing each of the plurality of PDs for user temperature sensing.

16. The method of claim 12, further comprising:
capturing a plurality of estimated user temperatures from each of the plurality of optical diodes;
detecting a spatial variation in the plurality of estimated user temperatures; and
in accordance with a determination that the detected spatial variation satisfies a spatial variation criterion, performing a corrective action.

17. The method of claim 12, further comprising:
capturing a plurality of estimated user temperatures from each of the plurality of optical diodes;
detecting a directional variation in the plurality of estimated user temperatures; and
in accordance with a determination that the detected directional variation satisfies a directional variation criterion, performing a corrective action.

18. The method of claim 12, further comprising:
capturing a plurality of estimated user temperatures from each of the plurality of optical diodes;
averaging the captured plurality of estimated user temperatures,
for each of the plurality of optical diodes, storing a difference between the estimated user temperature computed from the optical diode and the average as an offset; and
applying the offset to subsequent estimated user temperatures.

19. The method of claim 12, further comprising:
obtaining an absolute user temperature measurement; and
calibrating the estimated user temperature derived from each of the plurality of optical diodes using the absolute user temperature measurement.

20. The method of claim 12, further comprising estimating the user temperature from each of the plurality of optical diodes according to:

$$T = \frac{\Delta V_{BE} \cdot q}{\eta \cdot k} \ln\left(\frac{I_1}{I_2}\right)$$

wherein $I_1$ and $I_2$ are the at least two different bias currents, T is absolute temperature in Kelvin, $\Delta V_{BE}$ is a difference in the measured forward voltage of the optical diode for each of the at least two different bias currents applied to the optical diode, $\eta$ is an optical diode ideality factor, k is a Boltzmann constant, and q is an absolute value of electron charge.

21. The method of claim 20, further comprising performing a characterization procedure to determine the optical diode ideality factor $\eta$.

22. The method of claim 12, further comprising:
selectively configuring at least one of the plurality of optical diodes within a first area of the device intended for contact with a user as a first absolute temperature sensor;
generating a first absolute device temperature measurement at the first absolute temperature sensor;
selecting configuring at least one of the plurality of optical diodes within a second area of the device different from the first area as a second absolute temperature sensor; and
generating a second absolute device temperature measurement at the second absolute temperature sensor.

23. The method of claim 22, further comprising selectively configuring an input mechanism in the second area of the device including at least one of the plurality of optical diodes for rotational input detection or as the second absolute temperature sensor.

* * * * *